(12) United States Patent
Lettner et al.

(10) Patent No.: US 11,764,409 B2
(45) Date of Patent: Sep. 19, 2023

(54) BATTERY SYSTEM, METHOD FOR LEAKAGE DETECTION INSIDE THE BATTERY SYSTEM, AND VEHICLE INCLUDING THE BATTERY SYSTEM

(71) Applicant: SAMSUNG SDI CO., LTD., Yongin-si (KR)

(72) Inventors: Markus Lettner, Wettmannstatten (AT); Jurgen Fritz, Graz (AT); Patrick Stebl, Kaindorf (AT); Michael Schlick, Graz (AT)

(73) Assignee: Samsung SDI Co., Ltd., Yongin-si (KR)

( * ) Notice: Subject to any disclaimer, the term of this patent is extended or adjusted under 35 U.S.C. 154(b) by 94 days.

(21) Appl. No.: 17/160,677

(22) Filed: Jan. 28, 2021

(65) Prior Publication Data

US 2021/0265672 A1  Aug. 26, 2021

(30) Foreign Application Priority Data

Feb. 25, 2020 (EP) ...................................... 20159257
Jan. 19, 2021 (KR) ......................... 10-2021-0007543

(51) Int. Cl.
*H01M 10/42* (2006.01)
*H01M 10/6567* (2014.01)

(52) U.S. Cl.
CPC ..... *H01M 10/4228* (2013.01); *H01M 10/425* (2013.01); *H01M 10/6567* (2015.04); *H01M 2220/20* (2013.01)

(58) Field of Classification Search
None
See application file for complete search history.

(56) References Cited

U.S. PATENT DOCUMENTS 9,634,362 B2   4/2017  Dämon et al.
2012/0251859 A1* 10/2012 Payne ................. H01M 10/613
                                                                429/90

(Continued)

FOREIGN PATENT DOCUMENTS

DE   10 2013 201 411 A1   7/2014
EP       2 506 360 A1    10/2012

(Continued)

OTHER PUBLICATIONS

European Extended Search Report dated Jul. 21, 2020 for application 20159257.3.
Korean Office action dated Jan. 13, 2023.

*Primary Examiner* — Carmen V Lyles-Irving
(74) *Attorney, Agent, or Firm* — Lee IP Law, P.C.

(57) ABSTRACT

A battery system, a method of detecting leaks inside a battery system, and a vehicle, the battery system including a housing including a housing frame and a base frame, the housing frame and the base frame enclosing a housing space; a battery module including a plurality of battery cells electrically connected to each other via a bus bar, the battery module being in the housing space; a tray including a tray frame and a tray base; and a battery management system including a liquid detector, wherein the liquid detector is configured to detect a liquid inside the tray, and the liquid detector includes a high-voltage conductor, a first end of the high-voltage conductor being connected to the bus bar and a second end of the high-voltage conductor being between the base frame and the tray base.

13 Claims, 5 Drawing Sheets

(56) References Cited

U.S. PATENT DOCUMENTS

| | | | |
|---|---|---|---|
| 2013/0181826 A1* | 7/2013 | Yang | H01M 50/209 |
| | | | 340/455 |
| 2014/0015511 A1 | 1/2014 | Matthe et al. | |
| 2014/0190568 A1* | 7/2014 | Phlegm | H01M 50/60 |
| | | | 429/83 |
| 2014/0239904 A1* | 8/2014 | Tanaka | B60R 16/04 |
| | | | 320/128 |
| 2019/0334343 A1* | 10/2019 | Kim | H02H 3/16 |
| 2020/0020995 A1 | 1/2020 | Kim et al. | |

FOREIGN PATENT DOCUMENTS

| | | |
|---|---|---|
| JP | 2007-273353 A | 10/2007 |
| KR | 10-2012-0111999 A | 10/2012 |
| KR | 10-2014-0037305 A | 3/2014 |

* cited by examiner

BATTERY SYSTEM, METHOD FOR LEAKAGE DETECTION INSIDE THE BATTERY SYSTEM, AND VEHICLE INCLUDING THE BATTERY SYSTEM

CROSS-REFERENCE TO RELATED APPLICATION

European Patent Application No. 20159257.3, filed on Feb. 25, 2020, in the European Patent Office, and entitled: "A Battery System, A Method For Leakage Detection Inside A Battery System And A Vehicle Including A Battery System," is incorporated by reference herein in its entirety.

BACKGROUND

1. Field

Embodiments relate to a battery system, a method for leakage detection inside a battery system, and a vehicle including at least one battery system.

2. Description of the Related Art

In recent years, vehicles for transportation of goods and people have been developed using electric power as a source for motion. Such an electric vehicle is an automobile that is propelled by an electric motor, using energy stored in, e.g., rechargeable batteries. An electric vehicle may be solely powered by batteries or may be a form of hybrid vehicle powered by, e.g., a fuel-based power generator. The vehicle may include a combination of electric motor and conventional combustion engine. An electric-vehicle battery (EVB) or traction battery is a battery used to power the propulsion of battery electric vehicles (BEVs). Electric-vehicle batteries differ from starting, lighting, and ignition batteries because they are designed to give power over sustained periods of time. A rechargeable or secondary battery differs from a primary battery in that it can be repeatedly charged and discharged, while the latter provides only an irreversible conversion of chemical to electrical energy. Low-capacity rechargeable batteries are used as power supply for small electronic devices, such as cellular phones, notebook computers and camcorders, while high-capacity rechargeable batteries are used as the power supply for hybrid vehicles and the like.

Rechargeable batteries may include an electrode assembly including a positive electrode, a negative electrode, and a separator between the positive and negative electrodes, a case receiving the electrode assembly, and an electrode terminal electrically connected to the electrode assembly. An electrolyte solution may be injected into the case in order to facilitate charging and discharging of the battery via an electrochemical reaction of the positive electrode, the negative electrode, and the electrolyte solution. The shape of the case, e.g. cylindrical or rectangular, may depend on the battery's intended purpose. Lithium-ion (and similar lithium polymer) batteries, widely used in laptops and consumer electronics, dominate the most recent group of electric vehicles in development.

Rechargeable batteries may be used as a battery module formed of a plurality of unit battery cells coupled in series and/or in parallel so as to provide a high energy density, e.g., for motor driving of a hybrid vehicle. That is, the battery module is formed by interconnecting the electrode terminals of the plurality of unit battery cells depending on a required amount of power and in order to realize a high-power rechargeable battery.

A battery pack is a set of any number of (e.g., identical) battery modules. They may be configured in a series, parallel, or a mixture of both to deliver the desired voltage, capacity, or power density. Components of battery packs may include the individual battery modules, and the interconnectors, which provide electrical conductivity between them.

The mechanical integration of such a battery pack may use appropriate mechanical connections between the individual components, e.g. of battery modules, and between them and a supporting structure of the vehicle. These connections must remain functional and safe during the average service life of the battery system. Further, installation space and interchangeability requirements must be met, especially in mobile applications.

Mechanical integration of battery modules may be achieved by providing a carrier framework and by positioning the battery modules thereon. Fixing the battery cells or battery modules may be achieved by fitted depressions in the framework or by mechanical interconnectors such as bolts or screws. Alternatively, the battery modules are confined by fastening side plates to lateral sides of the carrier framework. Further, cover plates may be fixed atop and below the battery modules.

The carrier framework of the battery pack may be mounted to a carrying structure of the vehicle. In case the battery pack shall be fixed at the bottom of the vehicle, the mechanical connection may be established from the bottom side, e.g., by bolts passing through the carrier framework of the battery pack. The carrier framework may be made of aluminum or an aluminum alloy to lower the total weight of the construction.

Some battery systems may include a battery housing that serves as enclosure to seal the battery system against the environment and provides structural protection of the battery system's components. Housed battery systems may be mounted as a whole into their application environment, e.g. an electric vehicle. Thus, the replacement of defect system parts, e.g. a defect battery submodule, may require dismounting the whole battery system and removal of its housing first. Even defects of small and/or cheap system parts might then lead to dismounting and replacement of the complete battery system and its separate repair. As high-capacity battery systems are expensive, large, and heavy, said procedure may be burdensome and the storage, e.g. in the mechanic's workshop, of the bulky battery systems may be difficult.

SUMMARY

The embodiments may be realized by providing a battery system including a housing including a housing frame and a base frame, the housing frame and the base frame enclosing a housing space; a battery module including a plurality of battery cells electrically connected to each other via a bus bar, the battery module being in the housing space; a tray including a tray frame and a tray base; and a battery management system including a liquid detector, wherein the liquid detector is configured to detect a liquid inside the tray, and the liquid detector includes a high-voltage conductor, a first end of the high-voltage conductor being connected to the bus bar and a second end of the high-voltage conductor being between the base frame and the tray base.

The liquid detector of the battery management system may further include a low-voltage conductor, a first end of the low-voltage conductor being connected to the battery management system and a second end of the low-voltage conductor being between the second end of the high-voltage conductor and the tray base.

The liquid detector of the battery management system may include a resistance monitor configured to monitor a resistance between the high-voltage conductor and the tray base.

The resistance monitor may be configured to monitor a resistance between the low-voltage conductor and the tray base.

The battery management system and the tray may be connected to a same ground potential, and the liquid detector of the battery management system may be configured to detect liquid between the low-voltage conductor and the tray base.

The tray base may have a sloped surface.

The tray base with the sloped surface may include a reservoir, and the liquid detector of the battery management system may be configured to detect liquid inside the reservoir.

The second end of the high-voltage conductor and the second end of the low-voltage conductor may be inside the reservoir, and the second end of the low-voltage conductor may be between the second end of the high-voltage conductor and a base of the reservoir.

The reservoir may include an optically detectable surface.

The reservoir may include a drainage plug.

The high-voltage conductor may be integrally formed with the bus bar.

The embodiments may be realized by providing a method of detecting leaks inside a battery system, the method including providing a battery system that includes a housing including a housing frame and a base frame, the housing frame and the base frame enclosing a housing space, a cooling system with a cooling liquid, a battery module including a plurality of battery cells electrically connected to each other via a bus bar, the battery module being in the housing space and being configured to receive the cooling liquid for cooling, a tray including a tray frame and a tray base, and a battery management system including a liquid detector, the liquid detector being configured to detect a liquid inside the tray and including a high-voltage conductor, a first end of the high-voltage conductor being connected to the bus bar and a second end of the high-voltage conductor being between the base frame and the tray base; monitoring a decline in an amount of the cooling liquid inside the cooling system with the battery management system; monitoring an increase in an amount of the liquid inside the tray with the liquid detector of the battery management system; comparing the decline in the amount of the cooling liquid inside the cooling system with the increase in the amount of the liquid inside the tray with the battery management system; and verifying whether the liquid inside the tray is the cooling liquid by determining whether the decline in the amount of the cooling liquid inside the cooling system corresponds to the increase in the amount of the liquid inside the tray with the battery management system.

Monitoring the increase in the amount of the liquid inside the tray may include sending a first signal from a low-voltage conductor to the battery management system upon detection of liquid inside the tray.

Monitoring the increase in the amount of the liquid inside the tray may include sending a second signal from the high-voltage conductor to the battery management system upon detection of liquid inside the tray.

The embodiments may be realized by providing a vehicle including the battery system according to an embodiment.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
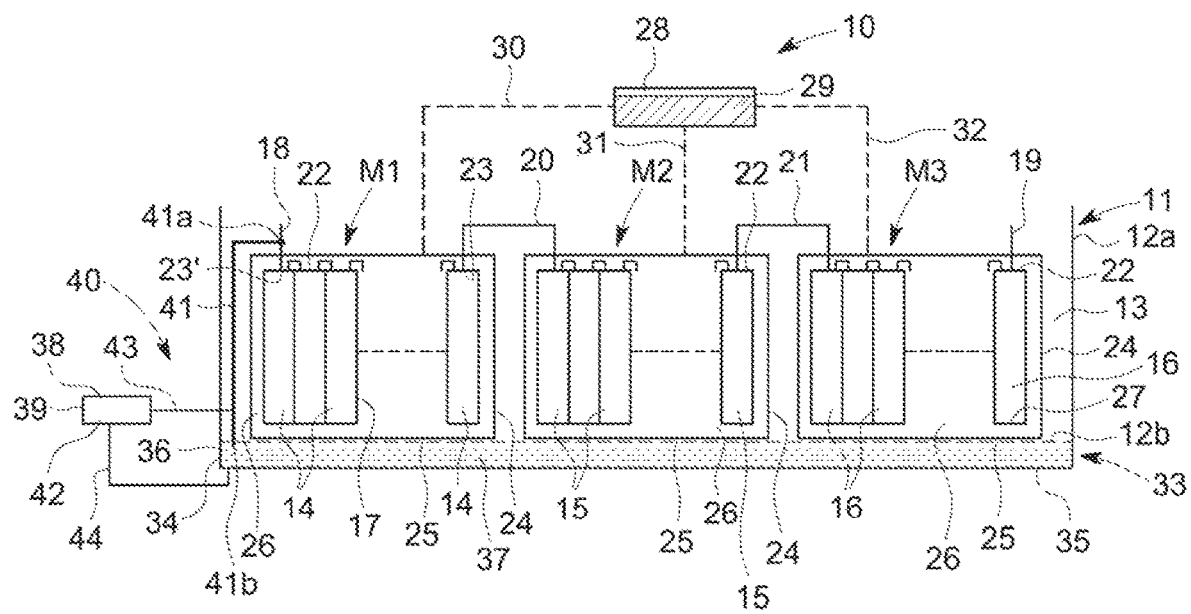
FIG. 1 illustrates a schematic perspective view of a battery system with a high-voltage conductor according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" include any and all combinations of one or more of the associated listed items. Further, the use of "may" when describing embodiments refers to "one or more embodiments."

It will be understood that although the terms "first" and "second" may be used to describe various elements, these elements should not be limited by these terms. These terms are only used to distinguish one element from another element (e.g., are not intended to necessarily require sequential inclusion of such elements). For example, a first element may be named as a second element and, similarly, a second element may be named as a first element, without departing from the scope herein.

In the following description of embodiments, the terms of a singular form may include plural forms unless the context clearly indicates otherwise.

It will be further understood that the terms "include," "comprise," "including," or "comprising" specify a property, a region, a fixed number, a step, a process, an element, a component, and a combination thereof but do not exclude other properties, regions, fixed numbers, steps, processes, elements, components, and combinations thereof.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. It will also be understood that when a component or an element is referred to as being "above" or "on" another component or element, it can be directly on the other component or element, or intervening components, or elements may also be present.

Unless otherwise defined, all terms (including technical and scientific terms) used herein have the same meaning as commonly understood. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a perspective view of a battery system 10 according to an exemplary embodiment. The battery system 10 may include a housing 11 including a housing frame 12a and a base frame 12b (depicted by a dashed line). The base frame 12b may have a rectangular shape and may be constructed of an electrically conductive material such as copper. The housing frame 12a and the base frame 12b may enclose a housing space 13. The battery system 10 may include a battery module, e.g., three battery modules M1, M2 and M3, namely a first battery module M1, a second battery module M2 and a third battery module M3. The battery modules M1, M2 and M3 may be in the housing space 13. Each of the battery modules M1, M2 and M3 may include a module housing 24 and module base 25, respectively, and each of the module housing 24 and the module base 25 enclose a corresponding module space 26, respectively. The module base 25 of each of the battery module M1, M2 and M3 may be supported by the base frame 12b. In an implementation, the battery modules M1, M2 and M3 may be on the base frame 12b. The module base 25 of each of the battery modules M1, M2 and M3 may be coupled to the base frame 12b by, e.g., a mechanical coupler or fastener. In an implementation, the size of the battery modules M1, M2 and M3 may be adapted such that the battery modules M1, M2 and M3 are fittingly disposed in the housing space 13 and are supported by the housing frame 12a and the base frame 12b of the battery system 10.

The first battery module M1 may include a plurality of battery cells 14, the second battery module M2 may include a plurality of battery cells 15 and the third battery module M3 may include a plurality of battery cells 16. In an implementation, the plurality of battery cells 14, 15 and 16 may be in the respective module space 26 of each of the corresponding battery modules M1, M2 and M3. Each of the plurality of battery cells 14, 15 and 16 of the respective battery modules M1, M2 and M3 may be electrically connected to each other by, e.g., a bus bar. In an implementation, the plurality of cells 14 of the first battery module M1 may be connected by a bus bar 18 and the plurality of cells 16 of the third battery module M3 may be connected by a bus bar 19. The plurality of cells 14 of the first battery module M1 may be electrically connected to the plurality of cells 15 of the second battery module M2 by a bus bar 20. The plurality of cells 15 of the second battery module M2 may be electrically connected by the plurality of cells 16 of the third battery module M3 by a bus bar 21. In an implementation, the bus bars 18, 19, 20 and 21 may be constructed of aluminum. In an implementation, the bus bars 18, 19, 20 and 21 may be constructed of other suitable metals, metal alloys, or electric conductive material. In an implementation, each of the bus bars 18, 19, 20 and 21 may be constructed of different materials independent of each other.

The battery cells 14, 15 and 16 according to an embodiment may include an electrode assembly, and a case 17 for accommodating the electrode assembly, the case 17 containing an electrolyte. The electrode assembly may be formed as a jelly roll type electrode assembly by spirally winding a positive electrode and a negative electrode with a separator therebetween. The electrolyte may include made of a lithium salt, e.g., $LiPF_6$ or $LiBF_4$, and an organic solvent, e.g. EC, PC, DEC, EMC, or EMC. The electrolyte solution may be in a liquid, solid, or gel state.

The battery cells 14, 15 and 16 may also include a cap assembly 22 for sealing an opening of the case 17. In an implementation, the battery cells 14, 15 and 16 may be a lithium ion secondary battery having a prismatic shape (or rectangular shape). The case 17 may have a substantially cuboidal shape, and an opening may be formed at one side thereof. The case 17 may be formed of a metal, e.g. aluminum.

The case 17 may further include a base 27, such that the base 27 and the side surfaces of the battery cells 14, 15 and 16 form a space for accommodating the electrode assembly and the electrolyte. In an implementation, the case 17 may be hermetically sealed by the cap assembly 22, and the base 27 and the cap assembly 22 may be parallel to each other. The cap assembly 22 may include positive and negative electrode terminals 23 and 23' having different polarities, and a vent. The vent may be a safety device of the battery cells 14, 15 and 16 and may act as a passage through which gas generated in the battery cells 14, 15 and 16 is exhausted to the outside of the battery cells 14, 15 and 16.

The battery system 10 may include a cooling system 28 with a cooling liquid 29, and the cooling system 28 may be configured to provide the cooling liquid 29 along respective paths 30, 31 and 32 to each of the battery modules M1, M2 and M3 for cooling the respective battery modules M1, M2 and M3. The battery module M1, M2 and M3 may be adapted to receive the cooling liquid 29 for cooling, such that the cooling liquid 29 may absorb heat energy released by the battery cells 14, 15 and 16 during the operation of the battery system 10.

The battery system 10 may include a tray 33. The tray 33 may include a tray frame 34 and a tray base 35. The tray frame 34 may be coupled to the tray base 35 by, e.g., welding or a mechanical fastener. The tray frame 34 and the tray base 35 may be electrically insulated. The tray base 35 may be located at a predetermined distance from the base frame 12b, such that the tray frame 34 and the tray base 35 may enclose a tray space 36. The tray space 36 may be configured to receive a liquid 37, e.g., a portion of the cooling liquid 29, which may leak from least one of the battery modules M1, M2 and M3 and get collected in the tray space 36. The base frame 12b may be in form of a frame skeleton structure, such that the base frame 12b includes an outer perimeter to support the module base 25 of the respective battery modules M1, M2 and M3 and a hollow space in between in order to reduce weight of the battery system 10 and to facilitate the passage of the liquid 37 therethrough. The liquid 37 may be leaked from the battery modules M1, M2 and M3 into the tray space 36. In an implementation, the base frame 12b may be in form of a grid, which supports the battery modules M1, M2 and M3 thereon and also to facilitate the passage of the liquid 37 therethrough. The liquid 37 may be leaked from the battery modules M1, M2 and M3 into the tray space 36. The tray frame 34 may be coupled to the base frame 12b by, e.g., mechanical coupling such as bolts and rivets or may be welded or by other suitable mechanical coupler. The tray frame 34 and the base frame 12b may be coupled such that they can be separated as desired. The tray frame 34 may be coupled to the base frame 12b, the tray frame 34 and the tray base 35 may be electrically insulated; and the tray base 35 may be located at a predetermined distance from the base frame 12b.

The battery system 10 may be integrated in a vehicle that may be electrically driven. In an implementation, the tray base 35 may be coupled to a chassis of the vehicle. In an implementation, the base frame 12b may be coupled to the chassis of the vehicle on one side of the chassis, such that the housing 11 of the battery system 10 is on the chassis. The tray base 35 may be coupled to the other side of the chassis, such that the liquid 37 which may be leaked from at least one of the battery modules M1, M2 and M3 is collected inside the tray space 36. In an implementation, the battery system 10 may include more than one tray 33 coupled to the housing 11. In an implementation, the predetermined distance between the tray base 35 and the base frame 12b may be reduced, in order to receive a same amount of leaked liquid 37 as compared to that by a single tray 33.

The battery system 10 may include a battery management system 38 that includes a microprocessor 39 and that is configured to manage the charging/discharging of the battery system 10. In an implementation, the battery system 10 may include a liquid detection system or liquid detector 40 which is integrated with the battery management system 38 (e.g., the battery management system 38 may include the liquid detector 40). The liquid detector 40 may be integrated in the battery management system 38, such that the liquid detector 40 is partially or fully a part of the battery management system 38. The battery management system 38 may be adapted to detect the liquid 37 inside the tray 33 via or by using the liquid detector 40. In an implementation, when there is a leakage from one of the battery modules M1, M2 and M3, such that the cooling liquid 29 therein is leaked out as the liquid 37 into the tray 33, then the liquid detector 40 may detect a variation in a characteristic, e.g., resistance, in the battery system 10 and send a signal to the battery management system 38. Upon receiving the signal from the liquid detector 40, the battery management system 38 may detect, determine, or confirm the presence of the liquid 37 inside the tray 33.

In an implementation, as shown in drawings, the liquid detector 40 may be integrated with the battery management system 38. The liquid detector 40 may include a high-voltage conductor 41 which lies outside the battery management system 38. A first end 41a of the high-voltage conductor 41 may be connected to the bus bar 18 and a second end 41b of the high-voltage conductor 41 may be between the base frame 12b and the tray base 35. In an implementation, the high-voltage conductor 41 may be electrically connected to an electrode of one of the battery cells 14, 15 and 16 at the first end 41a and at least partially arranged below the module base 25 of the battery modules M1, M2 and M3 at the second end 41b.

The liquid detector 40 may include a resistance monitoring system or resistance monitor 42 configured to monitor resistance between the high-voltage conductor 41 and the tray base 35. As shown in FIGS. 1 to 3 and 8 to 10, the resistance monitor 42 of the liquid detector 40 may be a part of the battery management system 38. The resistance monitor 42 may be electrically coupled to the high-voltage conductor 41 via an electrical conductor 43. The resistance monitor 42 may be electrically coupled to the tray base 35 via an electrical conductor 44. The resistance monitor 42 may be configured to output a resistance signal indicative of a resistance level between the high-voltage conductor 41 and the tray base 35. In the absence of a leakage, e.g., of the liquid 37, the resistance level between the high-voltage conductor 41 and the tray base 35 may be of a value corresponding to the value of an isolation resistance. In the case of a leakage of the cooling liquid 29 from at least one of the batter modules M1, M2 and M3, the liquid 37 collected inside the tray 33 may reach a level corresponding to a distance of the position of the second end 41b of the high-voltage conductor 41 from the tray base 35. In this case, the liquid 37 may form a conductive path, due to which the resistance level between the high-voltage conductor 41 and the tray base 35, may be reduced. Depending on the position of the second end 41b of the high-voltage conductor 41, a threshold resistance value may be experimentally or empirically determined. When the resistance monitor 42 outputs the resistance signal an instance of time, then at that instance of time, the microprocessor 39 may determine if the resistance level based on the outputted resistance signal is less than or equal to the threshold resistance value. In case, the level of the collected liquid 37 has not reached the level corresponding to the distance of the position of the second end 41b of the high-voltage conductor 41 from the tray base 35, e.g., that the liquid 37 has not touched the second end 41b, then the resistance level determined by the microprocessor 39 may be greater than the threshold resistance value. Hence, a presence of the liquid 37 inside the tray 33 is not detected. However, at a later instant of time, when a predetermined amount of the cooling liquid 29 is leaked from at least one of the battery modules M1, M2 and M3. Then the resistance level determined by the microprocessor 39 from the resistance signal outputted by the resistance monitor 42 at that instant of time may be less than or equal to the threshold resistance value. Hence, the liquid 37 inside the tray 33 may be detected.

In an implementation, other kinds of methodologies for the detection of the liquid 37 inside the tray 33 by detection on the basis of a variation of a characteristic in the battery system 10 may be adopted. In an implementation, the high-voltage conductor 41 may be connected to the bus bar 18, 19, 20 and 21, and may have a voltage potential corresponding to the voltage potential of the bus bar 18, 19, 20, 21, whereas the tray base 35 may have a same ground potential as the battery management system 38. This enables a predetermined voltage potential difference between the high-voltage conductor 41 and the tray base 35. When there is no liquid 37 between the high-voltage conductor 41 and the tray base 35, there may be no electrical connection between the high-voltage conductor 41 and the tray base 35. Hence, a signal based on a predetermined resistance value, which may be set corresponding to no electrical connection between the high-voltage conductor 41 and the tray base 35, may be sent to the battery management system 38. Similarly, a signal based on a threshold current flow value due to no electrical connection between the high-voltage conductor 41 and the tray base 35, may be sent by the liquid detector 40 to the battery management system 38. Based on which, the battery management system 38 may determine that no liquid 37 is present in the tray 33.

When the liquid 37 inside the tray 33 rises to a level such that it touches the second end 41b of the high-voltage conductor 41, an electrical connection between the high-voltage conductor 41 and the tray base 33 may be established. Thus, the signal based on a variation of the resistance value, which may be set corresponding to the established electrical connection between the high-voltage conductor 41 and the tray base 35 due to the liquid 37, may be sent to the battery management system 38. Similarly, the signal based on a variation in the current flow value due to the established electrical connection between the high-voltage conductor 41 and the tray base 35 due to the liquid 37, may be sent by the liquid detector 40 to the battery management system 38. Based on which, the battery management system 38 may determine that the liquid 37 is inside the tray 33.

In order to be able to detect the presence of the liquid 37 inside the tray 33 at an earlier stage, e.g., at a level lower than the position of the second end 41b of the high-voltage conductor 41, the liquid detector 40 may further include a low-voltage conductor 45, whose first end 45a may be connected to the battery management system 38 and whose second end 45b may be between the second end 41b of the high-voltage conductor 41 and the tray base 35. In an implementation, detection of the presence of the liquid 37 (leaked from at least one of the battery modules M1, M2 and M3) may occur earlier, e.g., when the level of the liquid 37 collected in tray 33 is lower than the position of the second end 41b of the high-voltage conductor 41. Thus, the presence of the liquid 37 at level further away from the module base 26 of the battery modules M1, M2 and M3 may be detected by the battery management system 38 by way of the low-voltage conductor 45 of the liquid detector 40. In an implementation, according to the use of such redundant sensors, e.g., the additional low-voltage conductor 45 along with the high-voltage conductor 41, a higher reliability for the detection of the liquid 37 inside the tray 33 may be achieved.

In an implementation, the resistance monitor 42 may be configured to monitor resistance between the low-voltage conductor 45 and the tray base 35. The resistance monitor 42, which may be integrated with the battery management system 38, may be electrically coupled to the low-voltage conductor 45, since the first end 45a is connected to the battery management system 38. The resistance monitor 42 may be electrically coupled to the tray base 35 via the electrical conductor 44. The resistance monitor 42 may be configured to output a resistance signal indicative of a resistance level between the low-voltage conductor 45 and the tray base 35. In the absence of a leakage, e.g., of the liquid 37, the resistance level between the low-voltage conductor 45 and the tray base 35 may be of a value corresponding to a predefined set value. In the case of a leakage of the cooling liquid 29 from at least one of the batter modules M1, M2 and M3, the liquid 37 collected inside the tray 33 may reach a level corresponding to a distance of the position of the second end 45b of the low-voltage conductor 45 from the tray base 35. In this case, the liquid 37 may form a conductive path, due to which the resistance level between the low-voltage conductor 45 and the tray base 35, may be reduced. When the resistance monitor 42 outputs the resistance signal at an instance of time, then at that instance of time, the microprocessor 39 may determine if the resistance level based on the outputted resistance signal is less than or equal to the predefined set value. In case, the level of the collected liquid 37 has not reached the level corresponding to the distance of the position of the second end 45b of the low-voltage conductor 45 from the tray base 35, e.g., that the liquid 37 has not touched the second end 45b, then the resistance level determined by the microprocessor 39 may be greater than the predefined set value. Hence, a presence of the liquid 37 in the tray 33 may not be detected. However, at a later instant of time, when a predetermined amount of the cooling liquid 29 has leaked from at least one of the battery modules M1, M2 and M3. Then the resistance level determined by the microprocessor 39 from the resistance signal outputted by the resistance monitor 42 at that instant of time may be less than or equal to the threshold resistance value. Hence, the presence of the liquid 37 inside the tray 33 may be detected. In an implementation, other kinds of methodologies for the detection of the liquid 37 inside the tray 33 by detection on the basis of a variation of a characteristic in the battery system 10 may be adopted.

In an implementation, the battery management system 38 and the tray 33 may be connected to the same ground potential, and the battery management system 38 may be adapted to detect the liquid 37 between the low-voltage conductor 45 and the tray base 35. In an implementation, the low-voltage conductor 45 may include a resistor.

Figure 3:
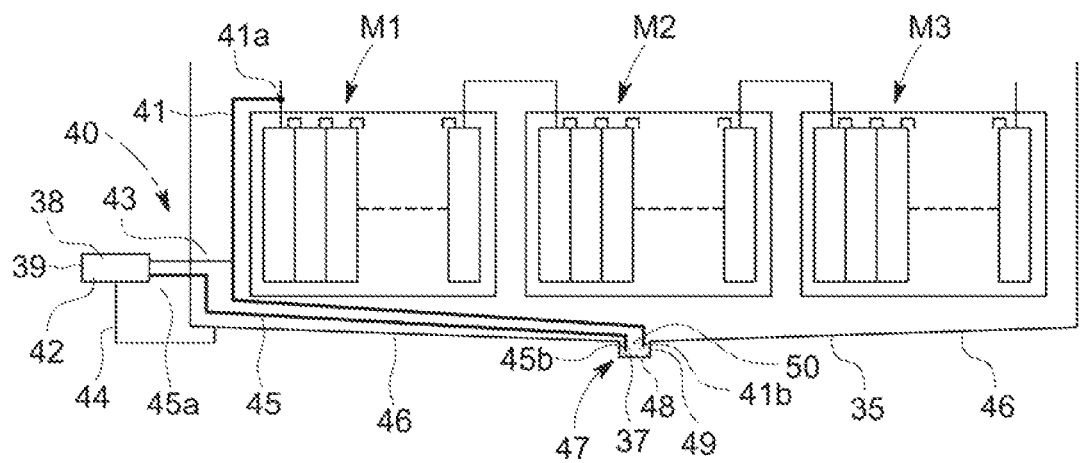
FIG. 3 illustrates a schematic perspective view of a battery system with a reservoir according to an embodiment.
Figure 4:
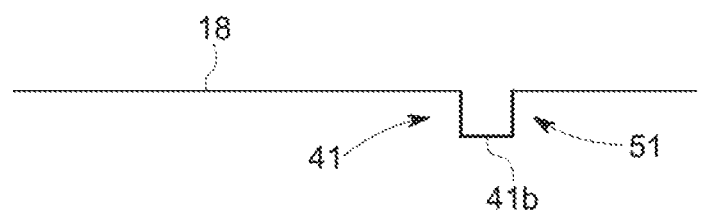
FIG. 4 illustrates a schematic view of a high-voltage conductor as a portion of a bus bar according to an embodiment.

As shown in FIG. 3, according to an embodiment, the tray base 35 may include a sloped surface 46. The tray base 35 with the sloped surface 46 may include at least one reservoir 47, e.g. one reservoir 47. The reservoir 47 may be located at a lowest point on the slope of the sloped surface 46, such that in case of a leakage of the cooling liquid 29, the liquid 37 may flow directly first into the reservoir 47 due to the gravitational force and is collected inside the reservoir 47. The reservoir 47 may be in the form of, e.g., a cylinder including a reservoir base 48 and reservoir wall 49. The reservoir base 48 and the reservoir wall 49 may enclose a reservoir space 50, in which the leaked liquid 37 may be first collected after the leakage. The reservoir 47 may include an opening end at the top, through which the leaked liquid 37 enters into the reservoir space 50. In an implementation, the tray base 35 may include the sloped surface 46 instead of a plane, level surface, and the reservoir 47, so that a detection of the liquid 37 may be facilitated for a much lesser (e.g., volume of) leakage of the liquid 37 from at least one of the battery modules M1, M2 and M3.

The second end 41b of the high-voltage conductor 41 and the second end 45b of the low-voltage conductor 45 may be inside the reservoir space 50. The second end 45b of the low-voltage conductor 45 may be between the second end 41b of the high-voltage conductor 41 and the reservoir base 48. In an implementation, this may facilitate an earlier detection of leaked liquid 37, even for a small amount of predetermined volume of leakage liquid 37, since the leaked liquid 37 flows directly inside the reservoir 47 and hence, may be first detected by the low-voltage conductor 45 followed by the high-voltage conductor 41 in case of a further leakage. As a whole, this advantageous embodiment may facilitate an early detection of the leakage of a small amount of the liquid 37 inside the reservoir 47 by the battery management system 38 using the liquid detector 40. In an implementation, the second end 41b of the high-voltage conductor 41 may be at a much higher level outside the reservoir 47, e.g., closer to the base frame 12b, whereas the second end 45b of the low-voltage conductor 45 may be inside the reservoir space 50.

The reservoir 47 may include an optically detectable surface. In an implementation, the reservoir base 48 or at least a part of the reservoir wall 49 may include an optically detectable surface or is at least partially transparent. In an implementation, a detection of the liquid 37 which may be leaked from at least one battery modules M1, M2 and M3 may be achieved by a simple optical inspection of the at least one optically detectable surface of the reservoir 47. In an implementation, an optical inspection of the tightness of the cooling system 28 or the detection of the leakage liquid 37 in the reservoir 47 may be carried out using an endoscopic camera in a simple and cost effective manner. In an implementation, the optically detectable surface of the reservoir 47 may be dry, and the cooling system may be considered to be tight or without any leakage. In an implementation, the tray base 33 may comprise a drainage plug. In an implementation, the tray base 33 may include an opening which may be closed by the drainage plug and may be connected to a pump, which may be connected to the battery management system 38. In case when the liquid 37 inside the tray is detected by the battery management system 38, then the battery management system 38 may regulate the opening of the drainage plug, so that the liquid 37 may be sucked out of the tray 33 by the pump. In an implementation, further or alternative mechanisms for the removal of the liquid 37 upon detection of the liquid 37 inside the tray 33 may be adopted.

Figure 2:
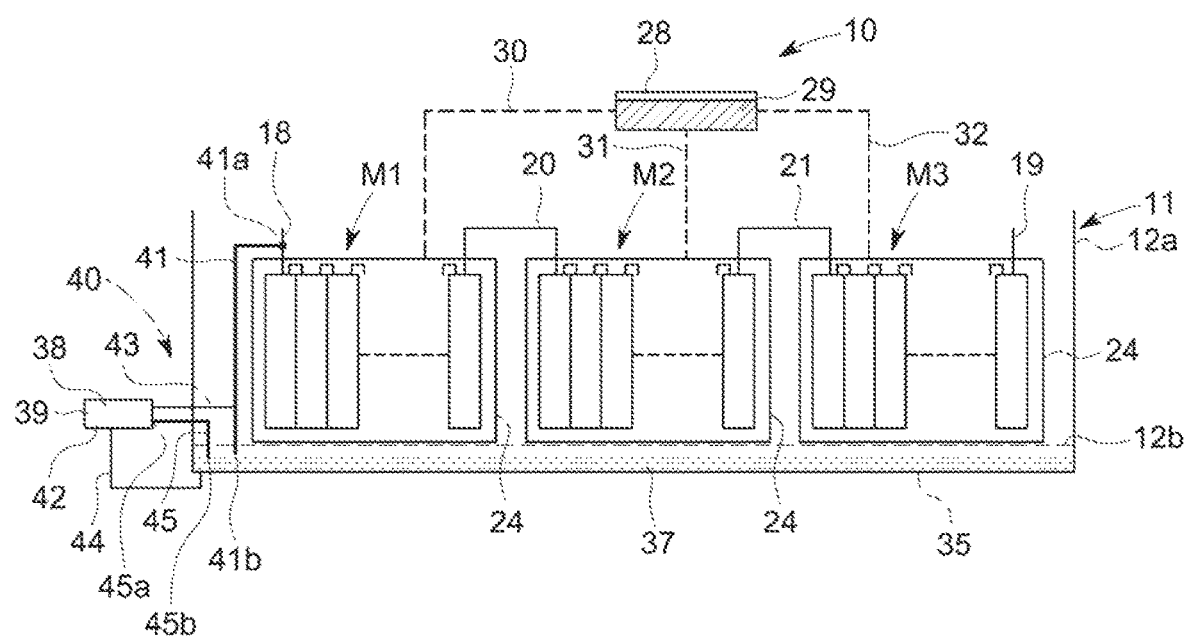
FIG. 2 illustrates a schematic perspective view of a battery system with the high-voltage conductor and a low-voltage conductor according to an embodiment.
Figure 5:
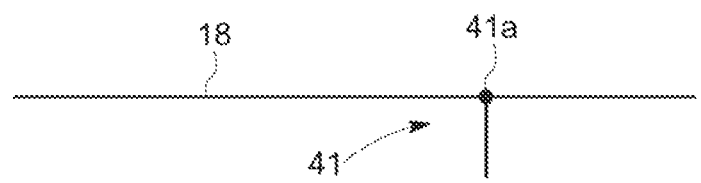
FIG. 5 illustrates a schematic view of a high-voltage conductor connected to a bus bar according to an embodiment.

In an implementation, as illustrated n in FIG. 4 and FIGS. 8 to 10, the high-voltage conductor 41 may be a portion 51 of, e.g., may be integrally formed with, the bus bar 18. In an implementation, the bus bar 18 may include a portion having the form of a dented structure, which may be a lowest point of the corresponding battery module M1, such the portion 51 is configured to function as the high-voltage conductor 41 of the liquid detector 40. The portion 51 of the bus bar 18 may include the second end 41b of the high-voltage conductor 41, e.g., at the lowest point of the battery module M1, such that the second end 41b of the high-voltage conductor 41 would be the first point of the battery module M1 that would come in contact with leaked liquid 37 in the case of a leakage of cooling liquid 29 from at least one of the battery modules M1 and M2. FIG. 5 depicts an embodiment, according to which, the high-voltage conductor 41 is in a form of a sensor wire connected to the bus bar 18, such that the first end 41a of the high-voltage conductor 41 is coupled to the bus bar 18, and the second end 41b of the high-voltage conductor 41 may be between the base frame 12b and tray base 35, as shown in FIGS. 1 and 2, or the second end 41b of the high-voltage conductor 41 may be in the reservoir space 50, as shown in FIG. 3.

Figure 6:
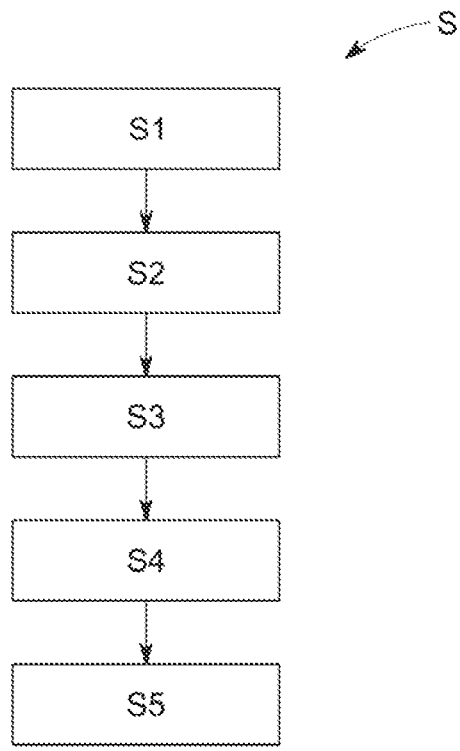
FIG. 6 illustrates a flow chart of a method for leakage detection inside a battery system according to an embodiment.

FIG. 6 illustrates a flow chart of a method S for leakage detection inside a battery system 10 according to an embodiment.

The method S may include a first step S1, which includes providing the battery system 10 including: a housing 11 that includes a housing frame 12a and a base frame 12b, wherein the housing frame 12a and the base frame 12b enclose a housing space 13; a cooling system 28 with a cooling liquid 29; at least one battery module M1, M2 and M3 including a plurality of battery cells 14, 15 and 16 electrically connected to each other, wherein the battery module M1, M2 and M3 may be in the housing space 13, wherein the battery module M1, M2 and M3 may be adapted to receive the cooling liquid 29 for cooling; at least one tray 33; a battery management system 38; and a liquid detector 40. The at least one tray 33 may include a tray frame 34 and a tray base 35, the tray frame 34 may be coupled to the base frame 12b; the tray frame 34 and the tray base 35 may be electrically insulated; and the tray base 35 may be located at a predetermined distance from the base frame 12b. The liquid detector 40 may be connected to the battery management system 38, and the battery management system 38 may be adapted to detect a liquid 37 inside the tray 33 by way of the liquid detector 40. The liquid detector 40 may include a high-voltage conductor 41, whose first end 41a is connected to the bus bar 18, 19, 20 and 21 and whose second end 41b is between the base frame 12b and the tray base 35.

The method S may include a second step S2, which includes monitoring a decline of (e.g., reduction in the amount of) the cooling liquid 29 inside the cooling system 28 by way of the battery management system 38.

The method S may include a third step S3, which includes monitoring an increase of (e.g., increase in the amount of) the liquid 37 inside the tray 33 by way of the battery management system 38.

The method S may include a fourth step S4, which includes comparing the decline of the amount of the cooling liquid 29 inside the cooling system 28 with the increase in the amount of the liquid 37 inside the tray 33 by way of the battery management system 38.

Lastly, the method S may include a fifth step S5, which includes verifying that the liquid 37 inside the tray 33 is the cooling liquid 29, if the decline of the amount of cooling liquid 29 inside the cooling system 28 corresponds to the increase of the amount of the liquid 37 inside the tray 33, by way of the battery management system 38.

Figure 7:
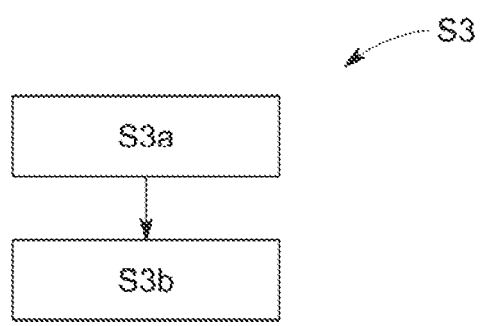
FIG. 7 illustrates a flow chart of a step of the method for leakage detection inside a battery system according to an embodiment.

FIG. 7 depicts a flow chart of the third step S3 of the method S for detecting the liquid 37 inside the battery system 10 according to an embodiment.

Figure 8:
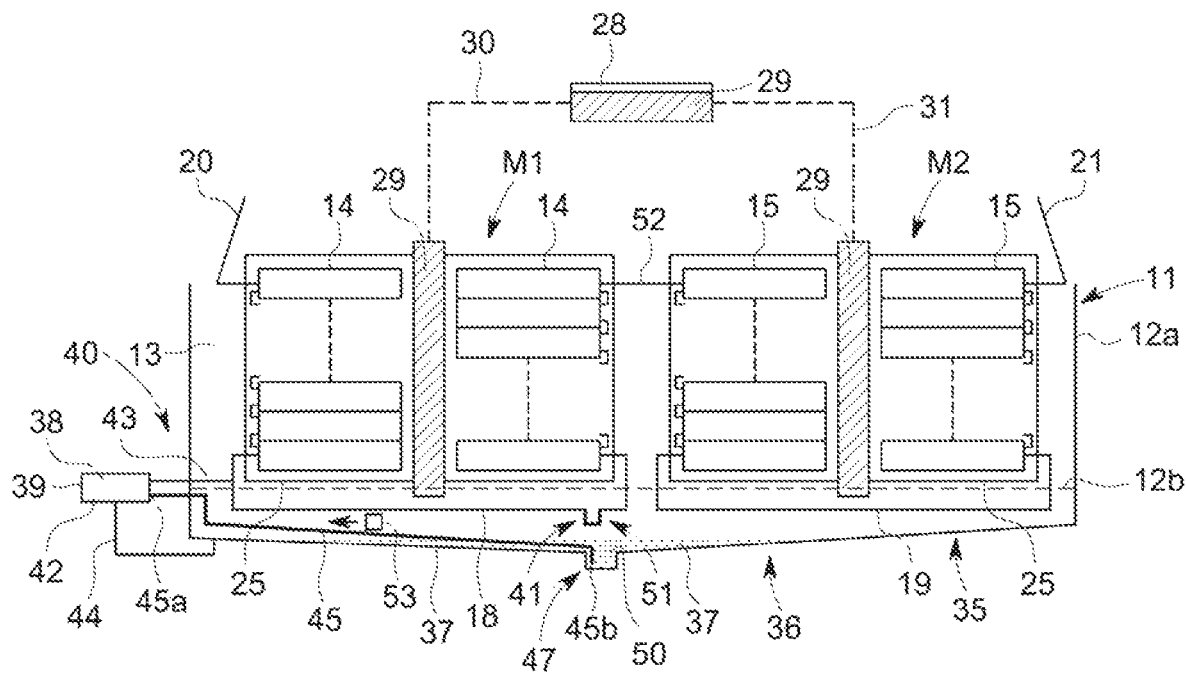
FIG. 8 illustrates a schematic perspective view of a battery system with the reservoir according to an embodiment.

The third step S3 for monitoring the increase of the amount of the liquid 37 inside the tray 33 may include a first sub-step S3a, in which a low-voltage conductor 45 sends a first signal 53, as shown in FIG. 8, to the battery management system 38 upon a detection of the liquid 37 inside the tray 33.

Figure 9:
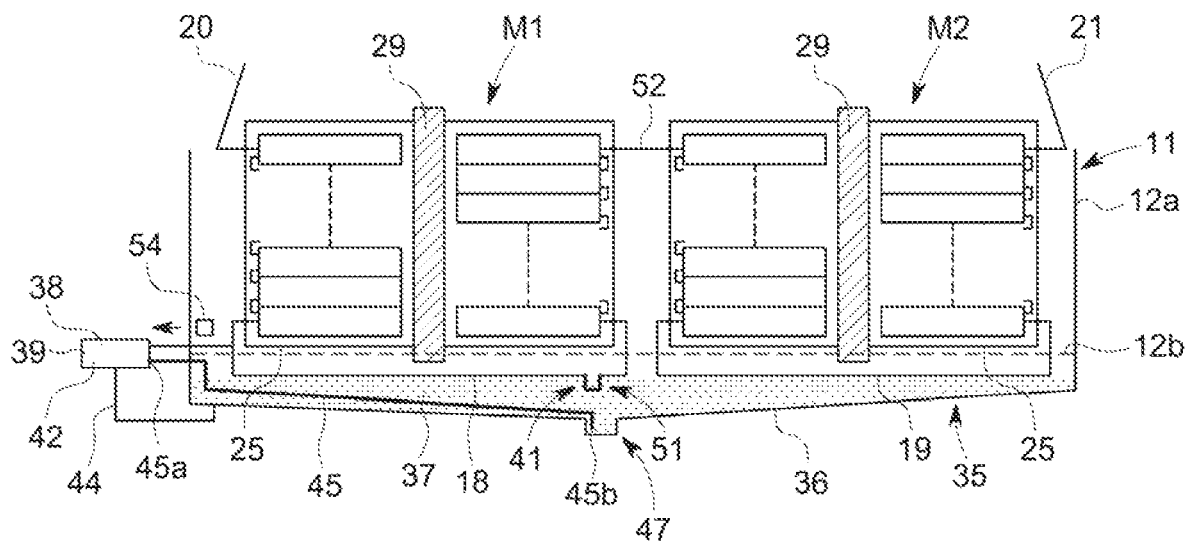
FIG. 9 illustrates a schematic perspective view of a battery system with the reservoir according to an embodiment.

The third step S3 for monitoring the increase of the amount of the liquid 37 inside the tray 33 may include a second sub-step S3b, in which the high-voltage conductor 41 sends a second signal 54, as shown in FIG. 9, to the battery management system 38 upon a detection of the liquid 37 inside the tray 33.

Figure 10:
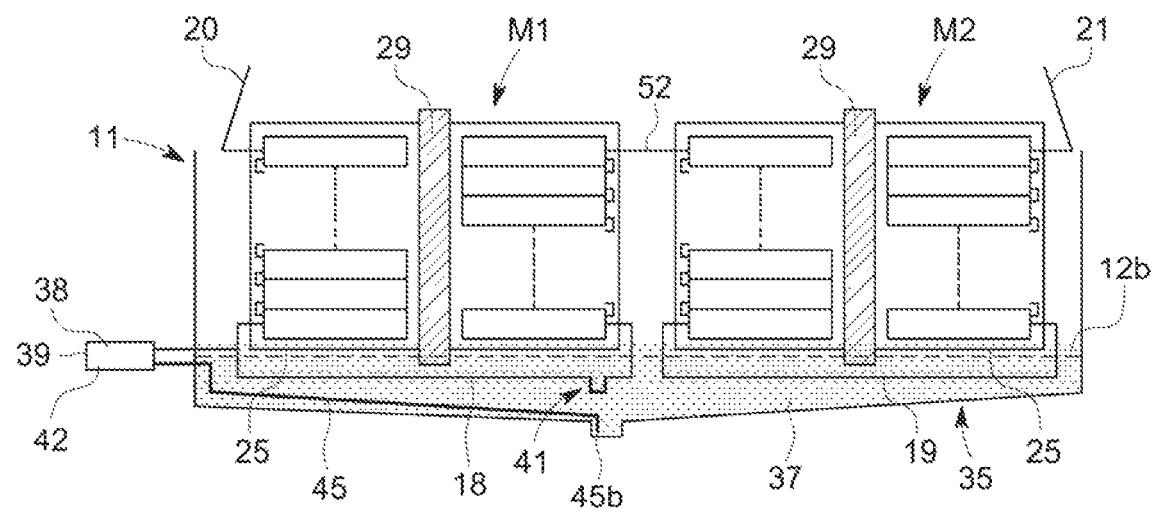
FIG. 10 illustrates a schematic perspective view of a battery system with the reservoir according to an embodiment.

According to the embodiments shown in FIGS. 8 to 10, the battery system 10 may include two battery modules M1 and M2 in the housing space 13, each including the plurality of battery cells 14 and 15, respectively. The plurality of battery cells 14 may be electrically connected to each other on an upper side of the battery system 10 by the bus bar 20, and the plurality of battery cells 14 may be electrically connected to each other on a lower side of the battery system 10 by the bus bar 18. The plurality of battery cells 15 may be electrically connected to each other on the upper side of the battery system 10 by the bus bar 21, and the plurality of battery cells 15 may be electrically connected to each other on the lower side of the battery system 10 by the bus bar 19. The plurality of battery cells 14 of the battery module M1 may be electrically connected with the plurality of battery cells 15 of the battery module M2 via a bus bar 52. The cooling system 28 may be configured to provide the cooling liquid 29 along respective paths 30 and 31 to each of the battery modules M1 and M2 for cooling the respective battery modules M1 and M2. The battery module M1 and M2 may be adapted to receive the cooling liquid 29 for cooling, such that the cooling liquid 29 may absorb heat energy that may be released by the battery cells 14 and 16 during the operation of the battery system 10. The high-voltage conductor 41 may be the portion 51 of (e.g., may be integrated with) the bus bar 18. As per the first sub-step S3a of the third step S3 of the method S for monitoring the increase in the liquid 37 inside the tray 33, in which the low-voltage conductor 45, whose second end 45b is within the reservoir space 50, sends the first signal 53 to the battery management system 38 upon a detection of the liquid 37 inside the reservoir 47. Hence, the low-voltage conductor 45 may send a pre-warning signal to the battery management system 38 regarding the leakage of at least one of the battery modules M1 and M2.

In an implementation, when the leakage of the cooling liquid 29 continues from at least one of the battery modules M1 and M2, then the level of the liquid 37 collected in the tray 33 may increase, such that at a particular instant of time, the liquid 37 reaches the second end 41b of the high-voltage conductor 41. In an implementation, the liquid 37 may reach the bus bar 18 of the battery module M1. At that instant, as per the second sub-step S3b of the third step S3 of the method S for monitoring the increase in the liquid 37 inside the tray 33, the high-voltage conductor 41 may send the second signal 54 to the battery management system 38 upon a detection of the liquid 37 inside the tray 33. Hence, the battery management system 38 may detect an isolation fault. The total amount of cooling liquid 29 in the battery system 10 may be known. Both the low-voltage conductor 45 and the high-voltage conductor 41 may lead to the detection of the liquid 37 at different levels inside the tray 33. The level of leakage may depend on the predetermined distance of respective second end 41b and 45b from the tray base 35. If the amount of the cooling liquid 29 in the battery system 10 is lower than the volume between the positions of the second end 41b and 45b of the respective high-voltage conductor 41 and the low-voltage conductor 45, then electrolysis of the cooling liquid may be considered to have occurred.

FIG. 10 shows that the liquid 37 may reach a further higher level, e.g. surpassing the position of the module base 25 of the respective battery modules M1 and M2. At such levels of the liquid 37, massive electrolysis may occur which may lead to producing detonating gases, which could damage the whole battery system 10. Hence, an early leakage detection of the cooling liquid 29 from at least one of the battery modules M1 and M2 may be performed using the battery system of an embodiment.

The embodiments may provide a vehicle including at least one battery system 10 for leakage detection.

By way of summation and review, to provide thermal control of a battery pack, a thermal management system may be used to safely use the battery module by efficiently emitting, discharging and/or dissipating heat generated from its rechargeable batteries. If the heat emission/discharge/dissipation were not sufficiently performed, temperature deviations could occur between respective battery cells, such that the battery module may not generate a desired amount of power. In addition, an increase of the internal temperature could lead to abnormal reactions occurring therein and thus charging and discharging performance of the rechargeable could deteriorate, and the life-span of the rechargeable battery could be shortened. Thus, cell cooling may effectively emit/discharge/dissipate heat from the cells.

Accordingly, a battery system may include a cooling system to cool the batteries. A liquid cooling system may be used instead of an air cooling system, due to the lower performance of the latter as compared to the liquid cooling system. The liquid cooling system may have a risk of a leakage issue, especially if the battery system is not tight. The cooling liquid from the battery module could leak in the battery housing. Hence, the battery housing would be filled-up with the liquid, which is the leaked cooling liquid from the battery module. Furthermore, the cooling liquid may be electrically conductive. Thus, if the liquid inside the battery housing were to reach a certain level, such that the liquid comes into to contact with the battery module, then safety related issues could occur, such as an insulation fault, electrolysis, release of explosive gases.

Some battery packs with a housing include battery and a liquid leak detection system including conductive wire grids and an open cell foam layer arranged between the conductive wire grids and some include a housing including a sensor, which is designed to detect a leaked liquid within the housing.

One or more embodiments may provide a battery system that can detect the presence of liquid inside the housing of the battery system.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery system, comprising:
 a housing including a housing frame and a base frame, the housing frame and the base frame enclosing a housing space;
 a cooling system with a cooling liquid;
 a battery module including a plurality of battery cells electrically connected to each other via a bus bar, the battery module being in the housing space and being configured to receive the cooling liquid for cooling;
 a tray including a tray frame and a tray base; and
 a battery management system including a liquid detector, wherein:
 the liquid detector is configured to detect the presence of the cooling liquid inside the tray,
 the liquid detector includes a first conductor, a first end of the first conductor being directly connected to the bus bar and a second end of the first conductor being between the base frame and the tray base such that the presence of the cooling liquid inside the tray is detectable when a depth of the cooling liquid in the tray is sufficient to contact the second end of the first conductor, and the liquid detector includes a resistance monitor configured to monitor a resistance between the first conductor and the tray base.

2. The battery system as claimed in claim 1, wherein the liquid detector of the battery management system further includes a second conductor, a first end of the second conductor being connected to the battery management system and a second end of the second conductor being between the second end of the first conductor and the tray base.

3. The battery system as claimed in claim 2, wherein the resistance monitor is configured to monitor a resistance between the second conductor and the tray base.

4. The battery system as claimed in claim 2, wherein:
the battery management system and the tray are connected to a same ground potential, and
the liquid detector of the battery management system is configured to detect liquid between the second conductor and the tray base.

5. The battery system as claimed in claim 2, wherein the tray base has a sloped surface.

6. The battery system as claimed in claim 5, wherein:
the tray base with the sloped surface includes a reservoir, and
the liquid detector of the battery management system is configured to detect liquid inside the reservoir.

7. The battery system as claimed in claim 6, wherein:
the second end of the first conductor and the second end of the second conductor are inside the reservoir, and
the second end of the second conductor is between the second end of the first conductor and a base of the reservoir.

8. The battery system as claimed in claim 6, wherein the reservoir includes an optically detectable surface.

9. The battery system as claimed in claim 6, wherein the reservoir includes a drainage plug.

10. The battery system as claimed in claim 1, wherein the first conductor is integrally formed with the bus bar.

11. A method of detecting leaks inside a battery system, the method comprising:
providing a battery system that includes:
a housing including a housing frame and a base frame, the housing frame and the base frame enclosing a housing space,
a cooling system with a cooling liquid,
a battery module including a plurality of battery cells electrically connected to each other via a bus bar, the battery module being in the housing space and being configured to receive the cooling liquid for cooling,
a tray including a tray frame and a tray base, and
a battery management system including a liquid detector, the liquid detector being configured to detect a liquid inside the tray and including a first conductor, a first end of the first conductor being connected to the bus bar and a second end of the first conductor being between the base frame and the tray base;
monitoring a decline in an amount of the cooling liquid inside the cooling system with the battery management system;
monitoring an increase in an amount of the liquid inside the tray with the liquid detector of the battery management system;
comparing the decline in the amount of the cooling liquid inside the cooling system with the increase in the amount of the liquid inside the tray with the battery management system;
verifying whether the liquid inside the tray is the cooling liquid by determining whether the decline in the amount of the cooling liquid inside the cooling system corresponds to the increase in the amount of the liquid inside the tray with the battery management system;
wherein monitoring the increase in the amount of the liquid inside the tray includes sending a first signal from a second conductor to the battery management system upon detection of liquid inside the tray; and
wherein monitoring the increase in the amount of the liquid inside the tray includes sending a second signal from the first conductor to the battery management system upon detection of the liquid inside the tray.

12. A vehicle including the battery system as claimed in claim 1.

13. A battery system, comprising:
a housing including a housing frame and a base frame, the housing frame and the base frame enclosing a housing space;
a cooling system with a cooling liquid;
a battery module including a plurality of battery cells electrically connected to each other via a bus bar, the battery module being in the housing space and being configured to receive the cooling liquid for cooling;
a tray including a tray frame and a tray base; and
a battery management system including a liquid detector, the liquid detector including a resistance monitor configured to monitor a resistance between a first conductor and the tray base, the liquid detector being configured to detect liquid inside the tray, a first end of the first conductor being connected to the bus bar and a second end of the first conductor being between the base frame and the tray base,
wherein:
the liquid detector is configured to detect the liquid inside the tray by:
monitoring a decline in an amount of the cooling liquid inside the cooling system with the battery management system;
monitoring an increase in an amount of the liquid inside the tray with the liquid detector of the battery management system;
comparing the decline in the amount of the cooling liquid inside the cooling system with the increase in the amount of the liquid inside the tray with the battery management system;
verifying whether the liquid inside the tray is the cooling liquid by determining whether the decline in the amount of the cooling liquid inside the cooling system corresponds to the increase in the amount of the liquid inside the tray with the battery management system;
wherein monitoring the increase in the amount of the liquid inside the tray includes sending a first signal from a second conductor to the battery management system upon detection of liquid inside the tray; and
wherein monitoring the increase in the amount of the liquid inside the tray includes sending a second signal from the first conductor to the battery management system upon detection of the liquid inside the tray.

* * * * *